US 6,729,661 B2

United States Patent
Perez-Sanchez

(10) Patent No.: US 6,729,661 B2
(45) Date of Patent: May 4, 2004

(54) LOCKING DEVICE FOR LOCKING TWO STRUCTURAL PARTS

(75) Inventor: Juan Perez-Sanchez, Feldkirchen-Westerham (DE)

(73) Assignee: EADS Deutschland GmbH, Ottobrunn (DE)

( * ) Notice: Subject to any disclaimer, the term of this patent is extended or adjusted under 35 U.S.C. 154(b) by 0 days.

(21) Appl. No.: 10/341,592

(22) Filed: Jan. 14, 2003

(65) Prior Publication Data

US 2003/0155776 A1 Aug. 21, 2003

(30) Foreign Application Priority Data

Jan. 14, 2002 (DE) .......................... 102 03 523

(51) Int. Cl.[7] .............................................. E05C 7/00
(52) U.S. Cl. ............................. 292/25; 292/26; 292/29
(58) Field of Search ............... 292/25–27, 30, 292/29, 97, 123, 196, 221, 223, 233

(56) References Cited

U.S. PATENT DOCUMENTS

| | | | | |
|---|---|---|---|---|
| 422,739 A | * | 3/1890 | Darmstadt | 292/25 |
| 2,506,943 A | * | 5/1950 | Shreve | 292/30 |
| 2,593,545 A | * | 4/1952 | Barbe | 16/232 |
| 2,693,099 A | * | 11/1954 | Vigmostad | 70/142 |
| 3,413,025 A | * | 11/1968 | Sperry | 292/111 |
| 5,171,048 A | * | 12/1992 | Weinerman et al. | 292/45 |
| 5,209,530 A | * | 5/1993 | Kolloch | 292/27 |

FOREIGN PATENT DOCUMENTS

GB        2 239 892 A    *   7/1991   ............. E05C/9/02

* cited by examiner

Primary Examiner—Gary Estremsky
(74) Attorney, Agent, or Firm—Crowell & Moring LLP

(57) ABSTRACT

A locking device is provided for locking two structural parts that are moveable relative to each other. A latch hook is disposed in a reference plane and is adapted to swivel on a joint with an axis center. An actuating element is provided for swivelling the latch hook about a latch hook axis. A rocking lever interacts with the actuating element for rotation about a rocking lever axis. The lever is connected with a first end of a steering arm via a first rotary joint. A second end of the steering arm is connected with the latch hook via a second rotary joint.

12 Claims, 7 Drawing Sheets

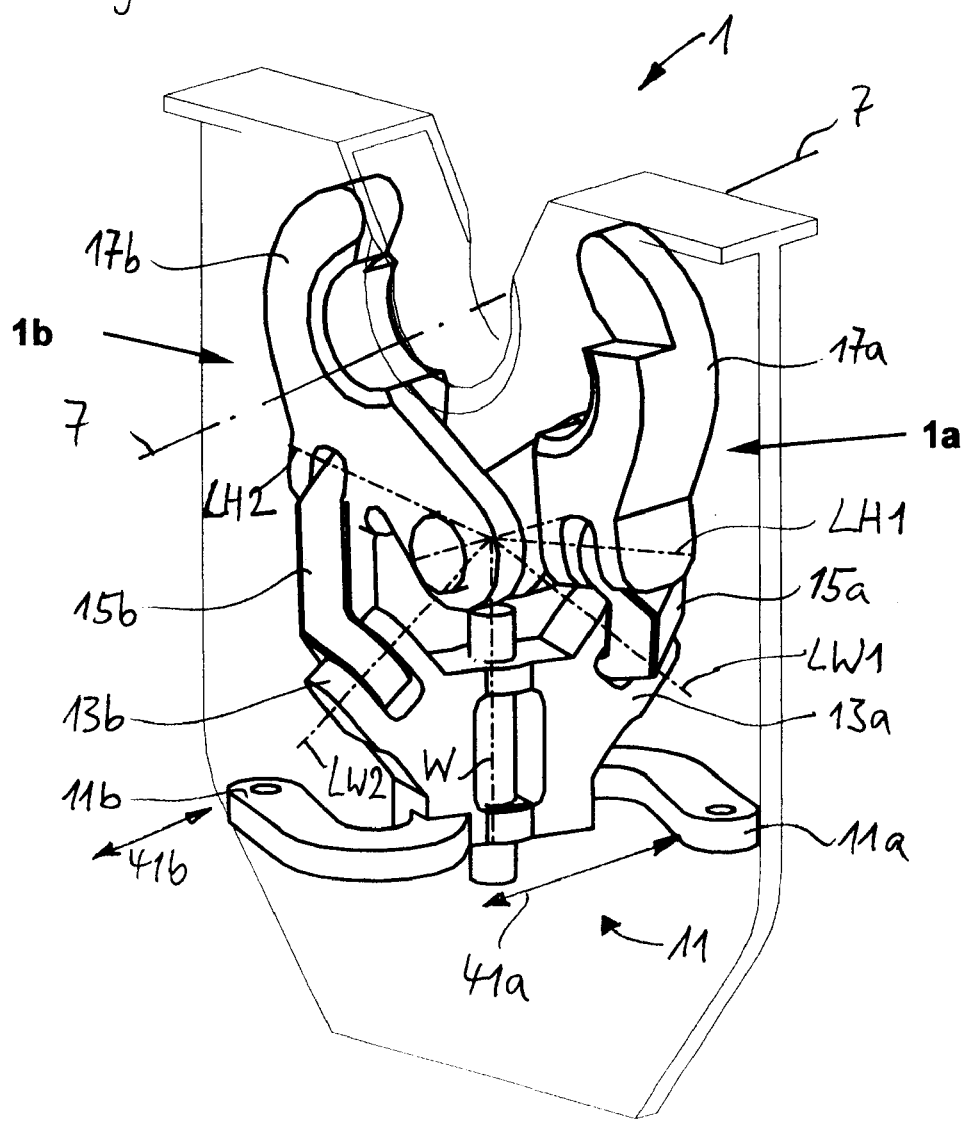

LOCKING DEVICE FOR LOCKING TWO STRUCTURAL PARTS

This application claims the priority of German application 102 03 523.7, filed Jan. 14, 2002, the disclosure of which is expressly incorporated by reference herein.

BACKGROUND AND SUMMARY OF THE INVENTION

This invention relates to a locking device for locking two structural parts and especially for locking a cockpit hood of a vehicle or, for example, an aircraft.

From the state of the art, we know of locking devices that are based on the shear-pin principle. For this principle, an eye-fork connection is used, in which a locking pin is moved through an eye to lock the cockpit. Unlocking occurs when the pin is pulled from this locked position. The disadvantage is that frictional forces must be overcome, which under certain conditions, such as great thermal stress, are very high. The cockpit hood can be prevented from opening if the locking device jams; a serious defect that can cause an emergency, and must absolutely be avoided.

It is therefore one object of the invention to make a locking device for cockpit hoods that prevents jamming under relatively high thermal stress.

This object is achieved by providing, in a locking device for locking two structural parts which are moveable relative to each other, at least one locking mechanism including a latch hook which is disposed in a reference plane and adapted to swivel on a joint with an axis center, an actuating element for swivelling the latch hook about a latch hook axis, a rocking lever that interacts with the actuating element for rotation about a rocking lever axis, and a steering arm having a first end with which the rocking lever is connected via a first rotary joint and a second end connected with the latch hook via a second rotary joint, and in which the rocking lever axis and axes of rotation of the first and second rotary joints intersect at the latch hook axis. Additional features are set forth in dependent claims.

Pursuant to the invention, a locking device for locking two structural parts, which are moveable relative to each other, is provided with a latch hook that is seated in a reference plane in a joint with an axis for swiveling the latch hook about an axis H via an actuating element. At least one locking mechanism is provided with a rocking lever interacting with the actuating element that rotates about an axis W, with the lever being connected with the first end of the steering arm via a first rotary joint. The second end of the steering arm is connected with the latch hook via a second rotary joint, and the axis of rotation W of the rocking lever as well as the axes of rotation LW1, LW2; LH1, LH2 of the first and the second rotary joints intersect at the axis H of the latch hook.

The locking device ensures jam-free locking and release of the pin.

One advantage of the invention is that the variety of possible designs provides a multiplicity of application possibilities.

BRIEF DESCRIPTION OF THE DRAWINGS

The invention is described in the following based on the attached figures.

FIG. 1b is a view of the locking device of FIG. 1a in its open position.

DETAILED DESCRIPTION OF THE INVENTION

Figure 1A:
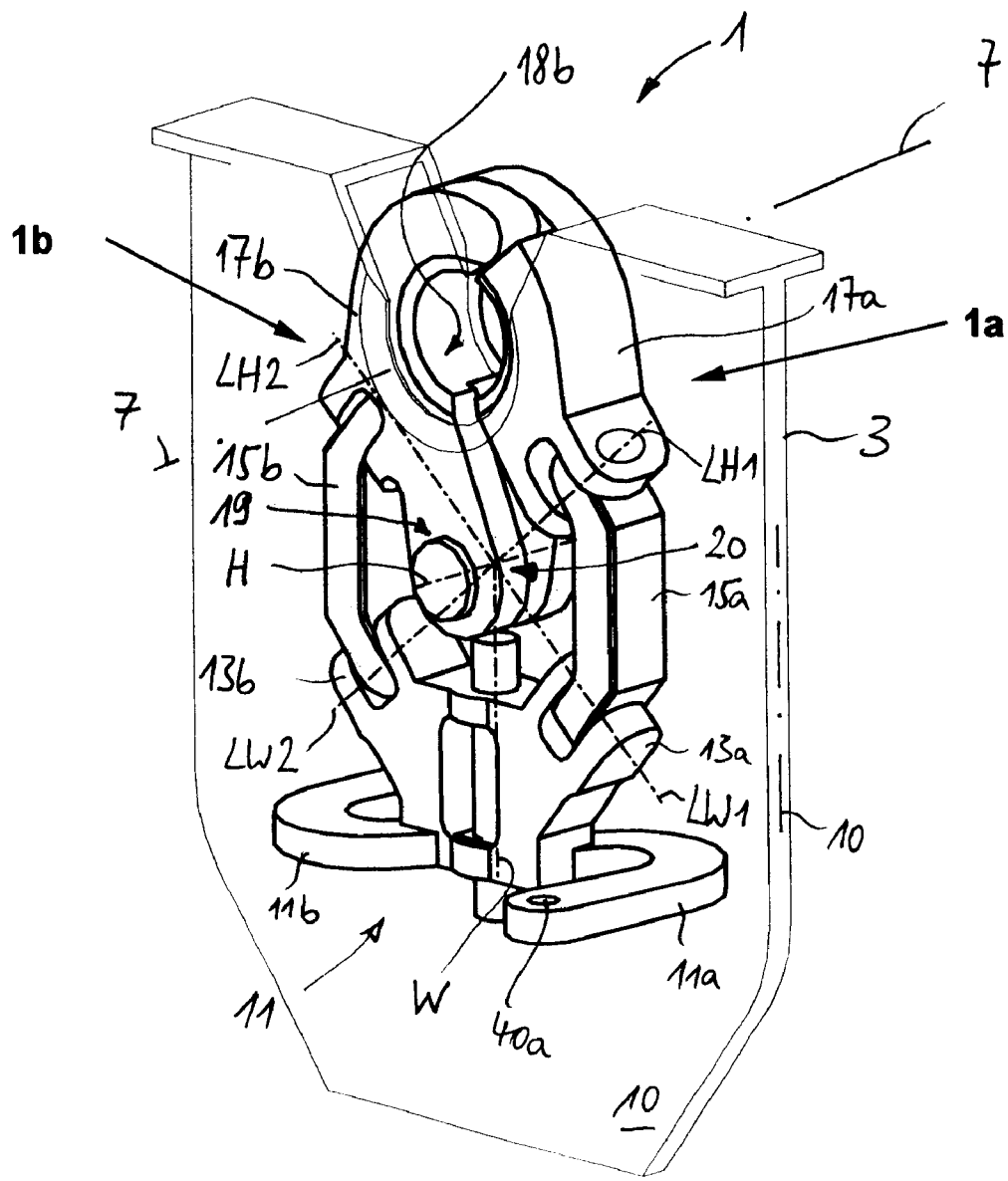
FIG. 1a is a view, in perspective, of one embodiment of the locking device of this invention integrated into a structural part, a section of which is shown in its closed position.

The locking device 1 of this invention is integrated in a first structural part, component or housing 3, which is attached thereto, and displaceable between a closed position and an open position due to the actuation of a control element (not shown). In its closed position, the locking device 1 meshes with a locking pin 5 of a pin bracket 6, which is released in the open position of the locking device 1. The pin bracket 6 is part of a second structural part (not shown), which interacts with the first structural part 3, wherein these parts can be locked and released with each other through the locking device. The first structural part 3 can be part of an aircraft fuselage (not shown), and the second structural part can be part of a cockpit hood. On the other hand, however, the locking device can also be installed on the cockpit hood and the pin bracket 6 or the second structural part can be integrated into the aircraft fuselage.

The locking pin 5 runs in the longitudinal direction 7, which preferably extends vertically to a reference plane 10. In the image in FIGS. 1 through 4, the position of the rib 9 is reflected as part of the structural part 3 due to the position of the reference plane 10.

The figures show a design of the locking device 1 with two locking mechanisms 1a and 1b with respective actuating levers 11a and 11b and respective rocking levers 13a and 13b connected therewith. Via a rotary movement about the same axis W and via a steering arm 15a or 15b, each rocking lever 13a, 13b acts upon a latch hook 17a or 17b, respectively, seated in a common rotary joint 19 with an axis center 20 and an axis or axis direction H. To lock the locking pin 5, both latch hooks are moved towards each other in a rotary movement with the axis center 20 as the pivot. When the movement of the latch hook 17a or 17b is determined by an axis H running perpendicularly to the reference plane 10, the latch hooks move in the reference plane 10 in a kind of swivel motion.

For this, each steering arm is connected by a first end 23a, 23b with the corresponding rocking lever 13a or 13b and by a second end 24a, 24b with the corresponding latch hook 17a or 17b in an articulating manner. The first ends 23a, 23b, respectively, are arranged at a distance A and the second ends 24a, 24b are arranged at a distance B to the axis W. In this way, the steering arm 15a, 15b is guided off-center to the axis W. In a special design, both distances A and B are equal.

The rocking lever is firmly connected with the actuating lever or seated in the housing or the structural part 3.

An actuating lever 11a or 11b, a steering arm 15a or 15b, as well as a latch hook 17a or 17b, each form a locking mechanism 1a or 1b.

Each rocking lever 13a, 13b is connected with a steering arm 15a or 15b in an articulating manner via a first rotary joint 21a or 21b, wherein the first rotary joint 21a or 21b leads to an axis of rotation LW1 or LW2. Additionally, each rocking lever 13a, 13b is connected with the appropriate latch hook 17a or 17b in an articulating manner via a second rotary joint 22a or 22b, wherein the second rotary joint 22a or 22b leads to an axis of rotation LH1 or LH2. The axes of rotation LW1 and LH1 or LW2 and LH2, as well as the axis of rotation W of the rocking lever motion of a locking mechanism 1a or 1b, are located in a reference plane 10, and intersect in the axis center 20 at an angle 30a or 30b. This angle can be 90 degrees in a starting position.

When arranged in pairs, the axes W, LW1 and LH1 or LW2 and LH2 of the locking mechanism 1a and 1b need not run symmetrically to one another when exhibiting the above-described course.

Due to this configuration, a rotation of the actuating lever about the axis W located in the reference plane 10 effects a swiveling of the steering arm in such a way that its end 24a or 24b connected with the corresponding latch hook 17a or 17b is moved in the reference plane and thus the latch hook 17a or 17b is moved into the open or closed position in the reference plane 10.

Actuation of the locking device 1 occurs via at least one actuating lever 11. In the design pursuant to FIGS. 1 through 4, a variation of the invented object is shown with two locking mechanisms 1a and 1b or two actuating levers 11a, 11b.

The two locking mechanisms 1a and 1b, which are provided in the design shown in FIGS. 1 through 4, interact in relation to the axis W so that, during actuation, the actuating levers are driven in opposite directions so that the steering arms 15a and 15b move point-symmetrically to the axis center 10 in order to move the latch hooks 17a and 17b towards or away from each other. Alternatively, the actuating devices can also move in the same direction or parallel to each other if, in a locking mechanism 1a or 1b, a corresponding mechanism is provided for changing the direction of actuation.

For this purpose, depending on the spatial arrangement of the elements of the locking mechanism 1a or 1b, a certain configuration of the rocking lever on the actuating lever and, possibly, a correspondingly angled design of the steering arm are to be provided.

The actuating lever is seated above the rotary joints and can also be guided in its motion by a guiding mechanism. An additional bearing for the actuating lever pivot bearing can be provided for this purpose in the structural part 3 (not shown).

For the purpose of actuating an actuating lever 11a or 11b and thus a rocking lever 13a or 13b, an actuating element 40 acts, e.g. linearly, in an actuating direction 41 upon the respective actuating lever 11a or 11b. In addition, the actuating element 40 can be a connecting rod or a driving element such as, for example, a hydraulic, pneumatic or electric actuating cylinder or actuating drive. Actuation can also occur via a mechanical transmission member such as, e.g., wire-rope haulage. Beneficially, the linear actuating direction 41 runs in the direction of the axis of rotation of the rotary joint 19 and the longitudinal direction of the pin 5. In an alternative design, the actuating lever 11a or 11b can also be driven by a rotatory driving element such as, e.g., a rotary actuating drive. Such a drive can be connected directly with a rocking lever. The type and design of the driving element depends on the respective application and, in particular, on the requirements with regard to available assembly space and the drive power that is to be made available.

The bearing surface 18a or 18b of the latch hook 17a or 17b, which rests in part against the surface of the locking pin 5 in the engaged position, preferably has a spherical design. Due to the spherical seating of the pin, warping of the same as well as of the locking device 1 is avoided due to dynamic motion.

In an alternative design of the invention, the invented locking device 1 can also comprise only one locking mechanism 1a. In this case, instead of a second locking mechanism 1b, a correspondingly designed immovable counter-piece, which is part of the structural part 3, is incorporated. It can also contain a latch hook that forms the counter-piece to the movable latch hook 17a for holding the pin 5. A centering spring F can also be used for this purpose.

Figure 2:
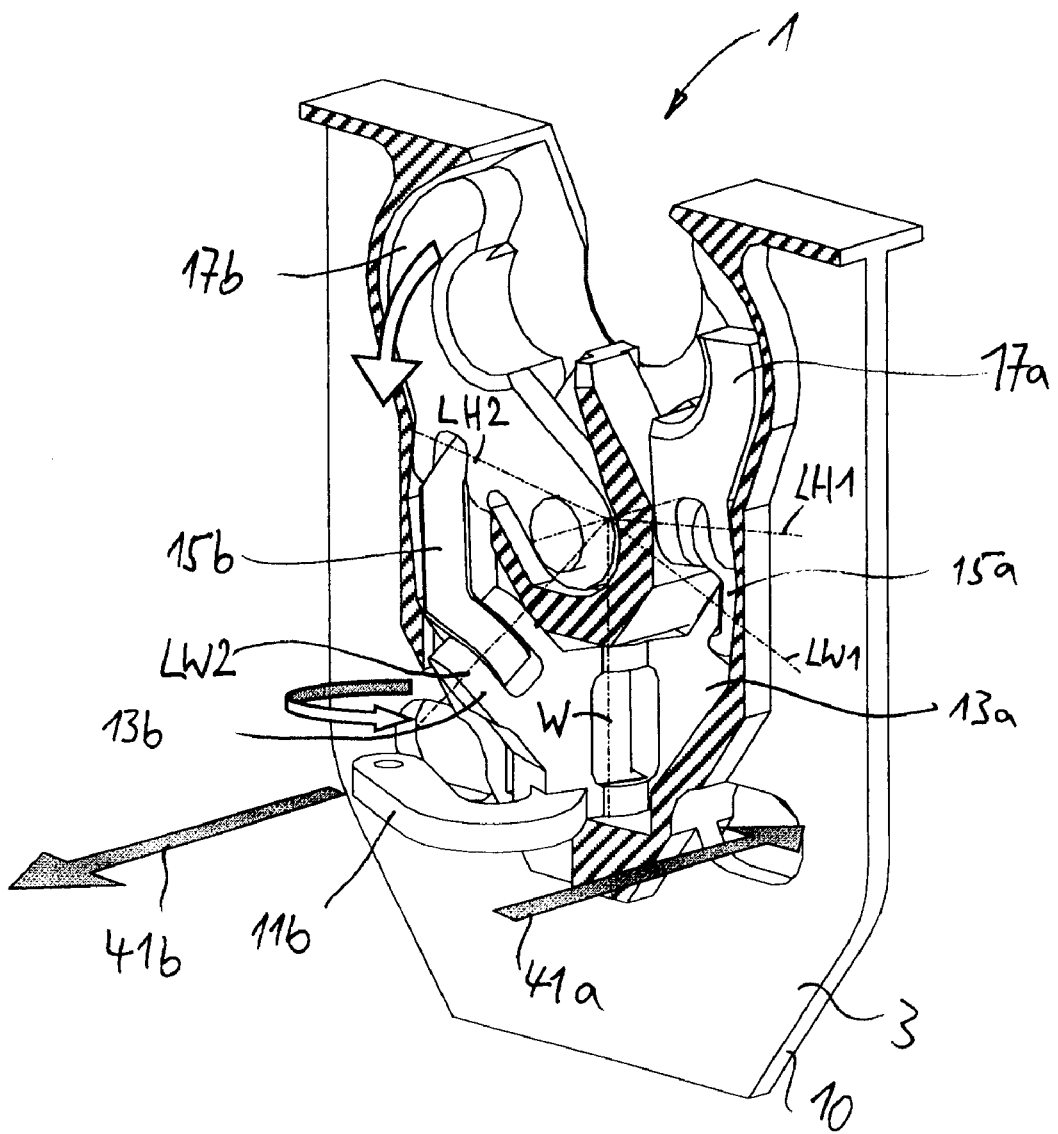
FIG. 2 is a view, in perspective, of the embodiment of the locking device of FIG. 1a or 1b in its open position, wherein the structural part, in which the locking device is integrated, is partially broken open.
Figure 3:
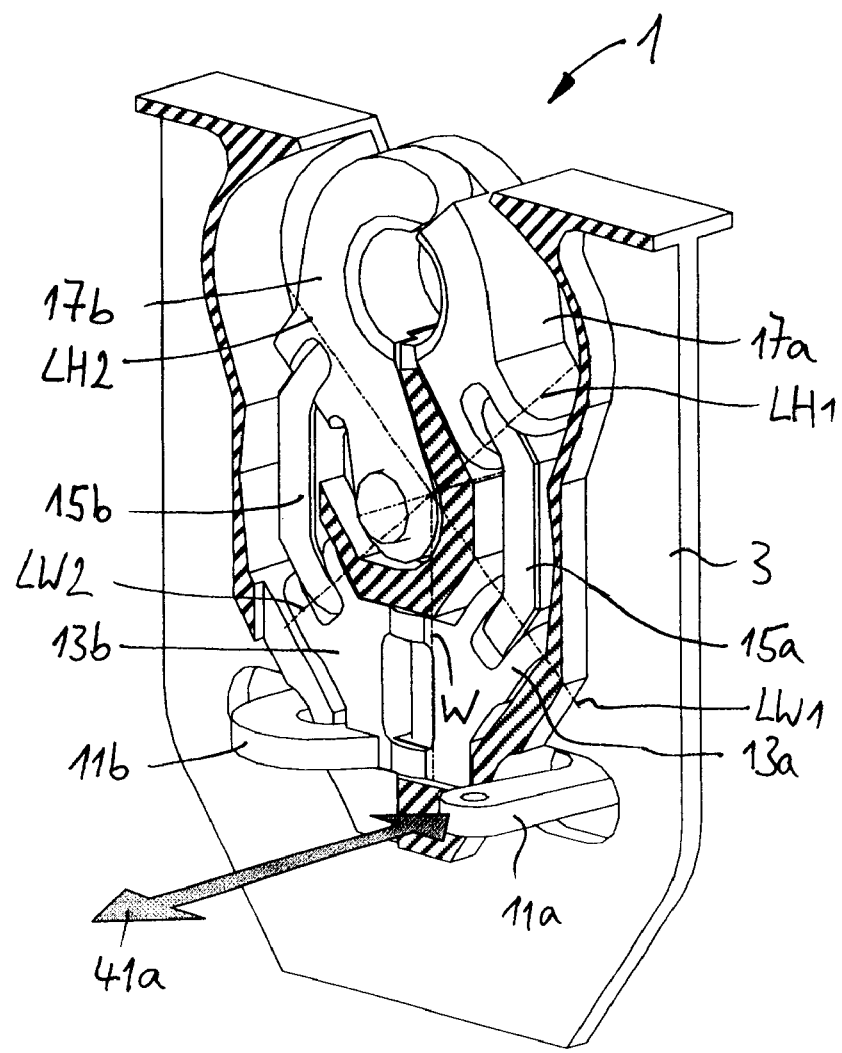
FIG. 3 is a view of the embodiment of the locking device of FIGS. 1a and 1b similar to that of FIG. 2 but showing the device in its closed position.
Figure 4A:
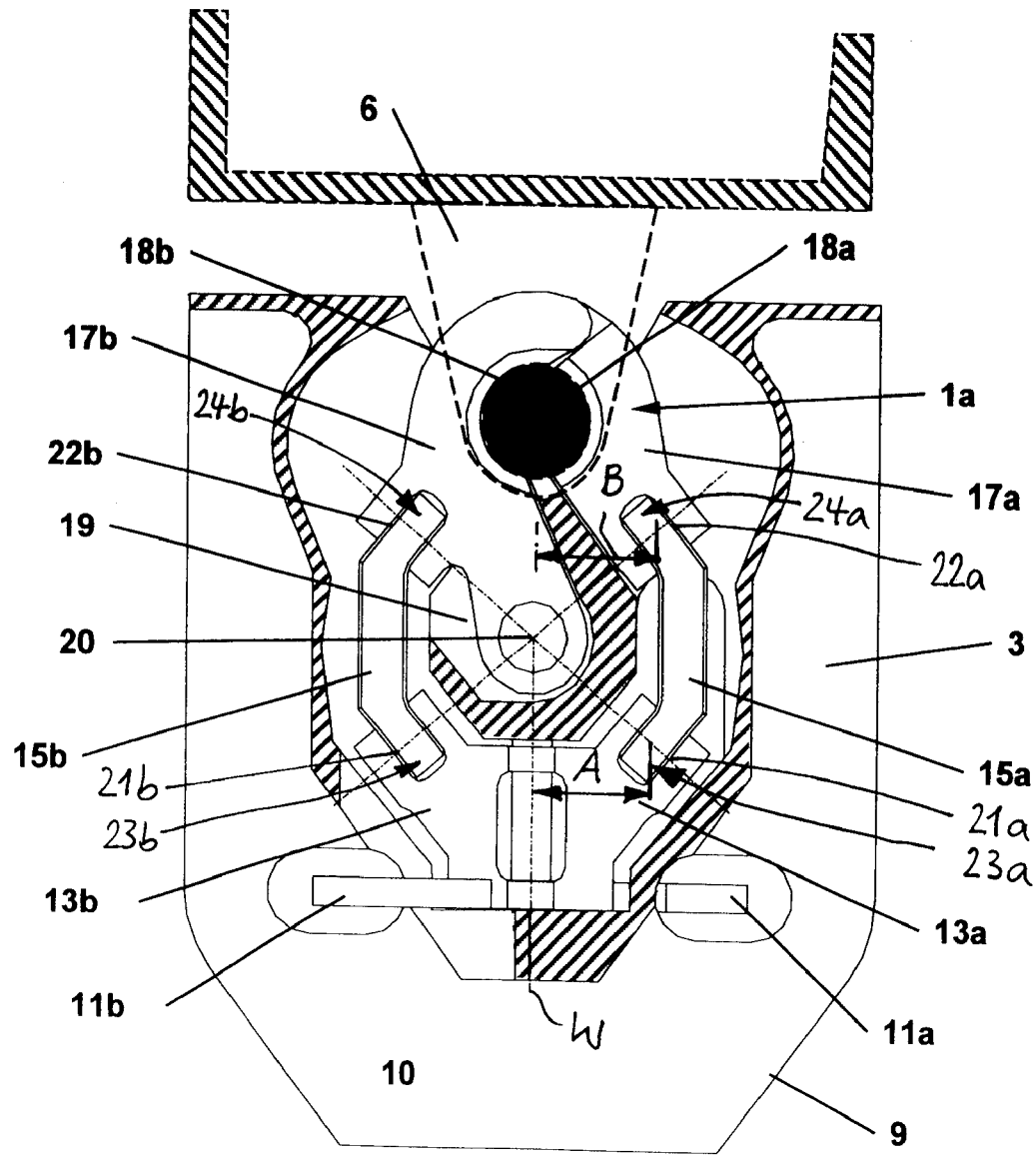
FIG. 4a is a frontal view of the embodiment of the locking device of FIGS. 1a and 1b in its closed position.
Figure 4B:
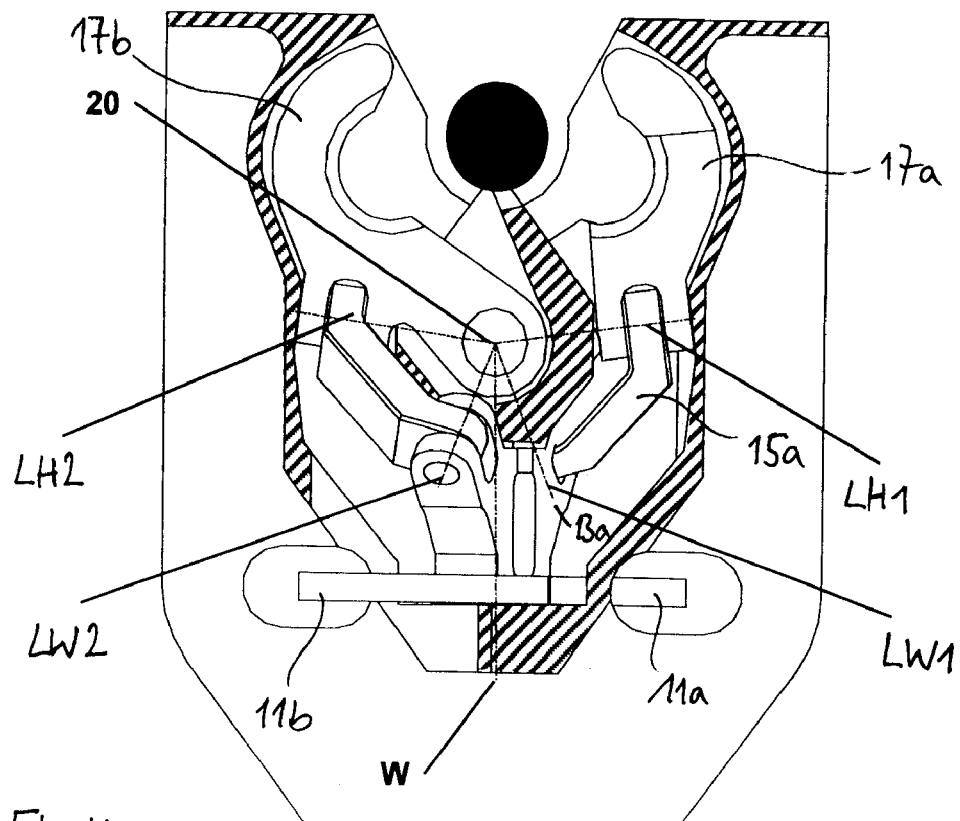
FIG. 4b is a frontal view similar to FIG. 4a but showing the device in its open position.
Figure 4C:
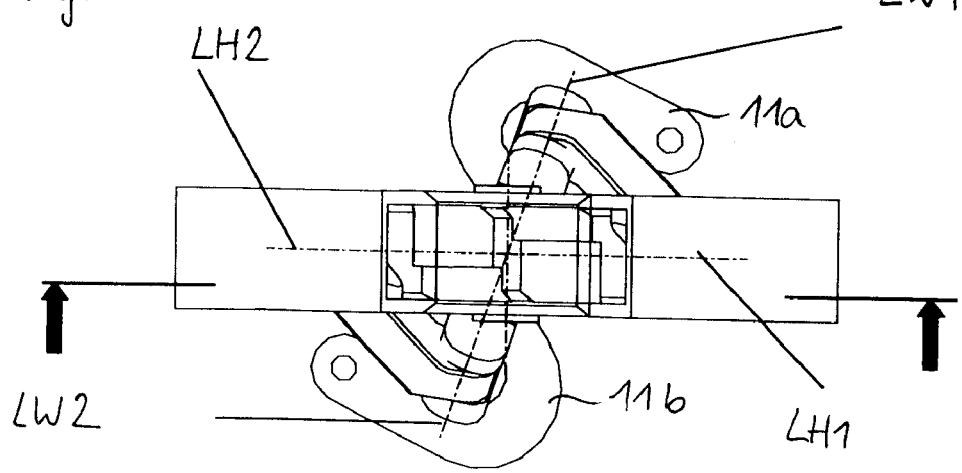
FIG. 4c is a view of the locking device of FIG. 4b from above.
Figure 5:
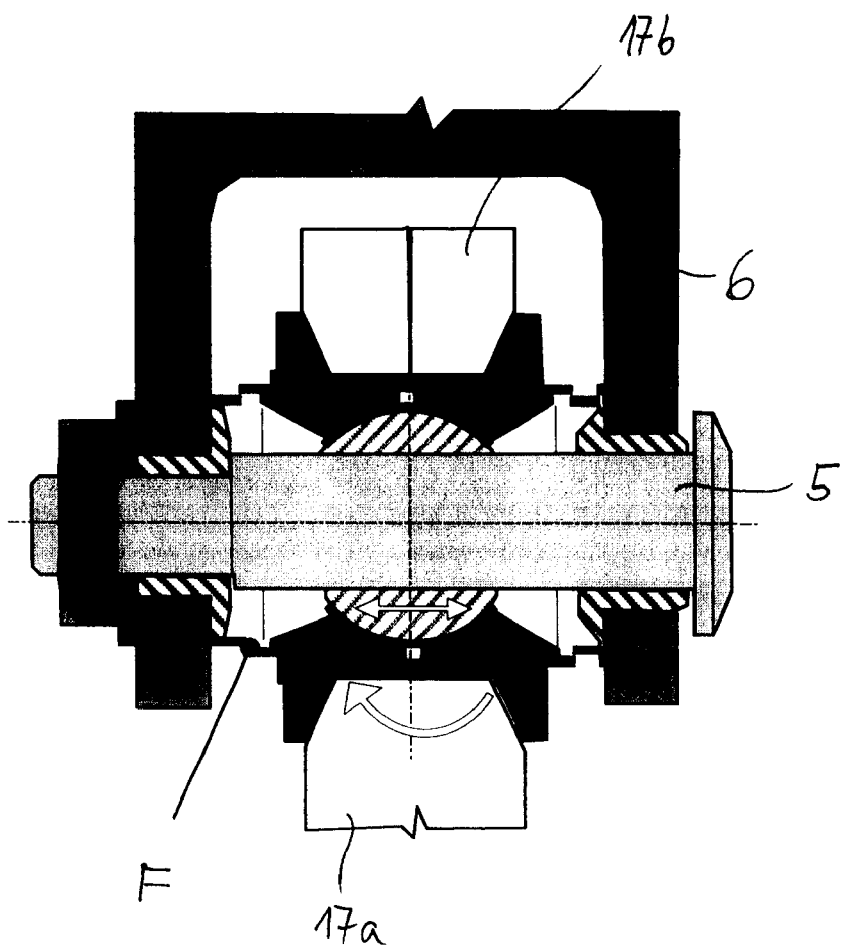
FIG. 5 is a sectional view through the locking device depicted in the above-described figures which, in its closed position, meshes with a locking bracket with a pin.

The following describes the function for opening the invented locking device 1 in the design shown in FIGS. 1 through 4:

Proceeding from the locking position of the locking device 1 or the latch hook 17a, 17b shown in FIG. 1, the device is brought into the open position shown in FIG. 2 through a corresponding rotation of the actuating lever 11a, 11b about the axis W located in the reference plane 10. During this process, the rotary joint 21a or 21b of the rocking lever is guided in a rotatory motion about the axis of rotation W at a distance A. Because the axes of rotation LW1 and LH1 or LW2 and LH2, as well as the axis of rotation W of the rocking lever motion, intersect at an axis center 20, the steering arms 13a and 13b are moved in such a way that the ends 24a or 24b connected with the corresponding latch hook 17a or 17b are moved in the reference plane 10 and, in this way, the latch hook 17a or 17b is moved into the open position in the reference plane 10.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

I claim:

1. A locking device for locking two structural parts which are moveable relative to each other, including at least one locking mechanism comprising:

a latch hook, which is disposed in a reference plane and adapted to swivel on a joint with an axis center, an actuating element for swivelling the latch hook about a latch hook axis, a rocking lever that interacts with the actuating element for rotation about a rocking lever axis, and a steering arm having a first end with which said rocking lever is connected via a first rotary joint and a second end connected with the latch hook via a second rotary joint, wherein the rocking lever axis and axes of rotation of the first and second rotary joints intersect at the latch hook axis.

2. The locking device according to claim 1, wherein said at least one locking mechanism is one of two locking mechanisms that interact with regard to the axis so that, during actuation, actuating levers are driven in opposite directions in order to move steering arms towards each other point-symmetrically in relation to the latch hook axis in order to move latch hooks towards or away from each other.

3. The locking device according to claim 1, wherein the latch hook has a bearing surface which has a spherical design and which, in an engaged position of the latch hook, rests in part against the surface of a locking pin.

4. The locking device according to claim 1, and further comprising an actuating lever on which the actuating element acts in a linear fashion.

5. The locking device according to claim 4, wherein the actuating element is an hydraulic actuating drive, a pneumatic actuating drive, or an electric actuating drive.

6. The locking device according to claim 4, wherein a rotary actuating drive acts upon the rocking lever in order to actuate it.

7. The locking device according to claim 2, wherein actuating elements act on the actuating levers in a linear fashion.

8. The locking device according to claim 7, wherein each actuating element is an hydraulic actuating drive, a pneumatic actuating drive, or an electric actuating drive.

9. The locking device according to claim 7, wherein a rotary actuating drive acts upon the rocking lever in order to actuate it.

10. The locking device according to claim 3, and further comprising an actuating lever on which the actuating element acts in a linear fashion.

11. The locking device according to claim 10, wherein the actuating element is an hydraulic actuating drive, a pneumatic actuating drive, or an electric actuating drive.

12. The locking device according to claim 10, wherein a rotary actuating drive acts upon the rocking lever in order to actuate it.

* * * * *